United States Patent [19]

Estaque

[11] 4,058,028
[45] Nov. 15, 1977

[54] TRANSMISSION-REGULATING DEVICE FOR MOTOR VEHICLE

[75] Inventor: Andre F. Estaque, Bagneux, France

[73] Assignee: Societé Anonyme Automobiles Citroen, Paris, France

[21] Appl. No.: 708,849

[22] Filed: July 28, 1976

[30] Foreign Application Priority Data

July 30, 1975 France .................. 75.23739

[51] Int. Cl.² ........................................... B60K 41/04
[52] U.S. Cl. ...................................... 74/865; 60/403
[58] Field of Search ................. 74/861, 865, 870, 871; 60/403, 423, 431

[56] References Cited

U.S. PATENT DOCUMENTS

| 2,888,806 | 6/1959 | Teumer | 60/403 |
| 3,202,012 | 8/1965 | Jania | 74/865 |

Primary Examiner—Stephen C. Bentley
Attorney, Agent, or Firm—Poms, Smith, Lande & Glenny

[57] ABSTRACT

A device for regulating the operation of the transmission of a motor vehicle having a variator including a distributor which is influenced by a centrifugal regulator and/or resilient means which may be additionally controlled by an accelerator, for supplying pressure fluid from a source to a cylinder chamber or for connecting the chamber to a reservoir, a piston movable in said cylinder chamber being connected to a step-down control element of the variator. As a safety device to prevent imbalance in the event of a failure of the centrifugal regulator, a two-piston electrically operated valve is incorporated between said source and said chamber, the valve being controlled by an electrical circuit arranged to close the valve and prevent the flow of pressure fluid from the source to the chamber if the speed of the engine exceeds a predetermined value. If desired, the valve may serve to control flow of pressure fluid to and from a hydraulic brake for the input shaft of the variator.

2 Claims, 2 Drawing Figures

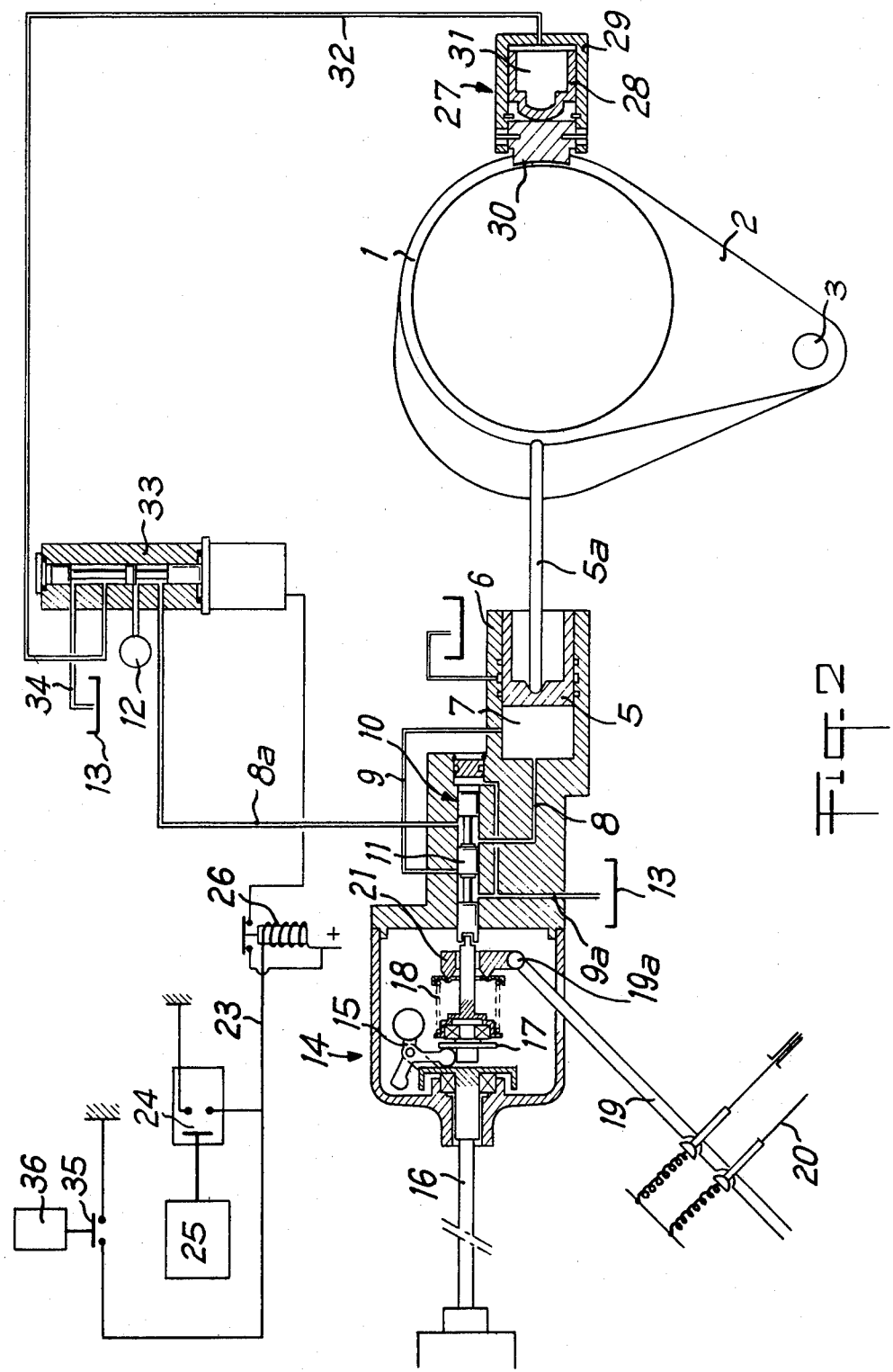

TRANSMISSION-REGULATING DEVICE FOR MOTOR VEHICLE

FIELD OF THE INVENTION

This invention relates to a device for regulating the operation of the transmission of a motor vehicle having a variator which includes a step-down control element.

In motor vehicles, in which the transmission incorporates a variator, the position of the variator or of at least one of its elements, and therefore the step-down of the variator, may be made subject to the position of the acceleration control and to the value of the engine speed.

This control arrangement which is generally hydraulic is effected by means of a receiver consisting of a cylinder and a piston adapted for movement in respect of the cylinder and connected to the variator step-down control element. The piston is subject to the action of a pressurised fluid, the admission of which into a chamber defined in the cylinder and the discharge of which from the chamber are controlled by a distributor. This distributor is subject to the opposing actions of a centrifugal regulator attached to a rotary member in the engine and a flexible member e.g. a spring, the tension of which depends upon the degree of depression of the acceleration control means of the vehicle. As a function of the predominance of one or other of these effects respectively or dependent upon their balance, so the distributor opens the inlet to or the discharge from the chamber or isolates this latter from the source of fluid and from the reservoir.

Generally, the inlet of pressurised fluid into the cylinder gives rise to a displacement of the step-down control element of the variator in the sense of producing a greater degree of speed reduction. The variator likewise comprises an internal restoring means which endeavours to restore the said control element to its position of slight gear reduction.

One of the drawbacks of these devices is that, if a fault occurs, particularly in respect of the centrifugal regulator or its drive system, the effect of the acceleration control means then becomes predominant since it is not counterbalanced by that of the centrifugal regulator, which places the distributor aforesaid in a position which allows the inlet of pressuriesed fluid into the above-mentioned chamber. The step-down control element of the variator is then pushed into its position of considerable speed reduction. Thus, and particularly if this fault occurs at high speed, there is a racing of the engine which may result in very serious damage or even an accident.

It is an object of the present invention to remedy or reduce this disadvantage by providing a device in which is incorporated a safety system for eliminating the risk of racing of the engine in the case of damage to the centrifugal regulator or to its drive system.

BRIEF DESCRIPTION OF THE INVENTION

According to the present invention there is provided a device for regulating the operation of the transmission of a motor vehicle having a variator which includes a step-down control element, said device comprising a hydraulic receiver, an element movable in said receiver to define therewith a chamber, means connecting said movable element with the step-down control element of the variator, distributor means associated with said receiver, a slide valve to said distributor means, a source of pressure fluid, a reservoir for pressure fluid, first conduit means adapted to communicate said chamber through said distributor means with said source, second conduit means adapted to communicate said chamber through said distributor means with said reservoir, a centrifugal regulator movable in response to engine speed, connecting means associating the slide valve with the centrifugal regulator, resilient means associated with said connecting means, means for controlling said resilient means in response to operation of an accelerator for said engine, said centrifugal regulator, said resilient means and said control means serving to establish three positions for said slide valve, in the first of which the effect of the resilient means predominates and communication is established between said chamber and said source through said first conduit means while preventing communication between said chamber and said reservoir through said second conduit means, in the second of which the effect of said centrifugal regulator predominates and communication is established between said chamber and said reservoir through said second conduit means while preventing communication between said chamber and said source through said first conduit means, and in the third of which the effects of the resilient means and the centrifugal regulator are in equilibrium and communication is prevented between said chamber and both said source and said reservoir, a two-position electrically operable valve in said first conduit means and having a normally open position connecting said first conduit means with said source, an energising circuit for said valve, switch means normally holding said energising circuit open, and a device for detecting the rotary speed of the engine when said speed is at least equal to a predetermined value and for closing said switch means thereby to energise said circuit, close said valve and thus close said first conduit means.

In a preferred embodiment, the present device further comprises an input shaft to said variator, a cylinder, a piston slideably mounted in said cylinder, a shoe carried by the free end of said piston for engagement with said input shaft, said piston and cylinder defining a further chamber, third conduit means connecting said further chamber with said valve, two further connections to said valve, one for said third conduit means and the other leading to said reservoir, the valve in its normally open position establishing communication between said source and said chamber through the first conduit means, and between said reservoir and said further chamber through the third conduit means, and in its closed position establishing communication between said source and said further chamber through said third conduit means, second switch means in said energising circuit and in parallel with the first mentioned switch means, and a control element of said piston and cylinder, said control element serving to operate said second switch means.

DETAILED DESCRIPTION OF INVENTION WITH REFERENCE TO DRAWINGS

In order to enable the invention to be more readily understood, reference will now be made to the accompanying drawings, which illustrate diagrammatically and by way of example two embodiments thereof, and in which:

FIG. 2 is a part sectional diagram of an alternative embodiment of the device illustrated in FIG. 1.

Figure 1:
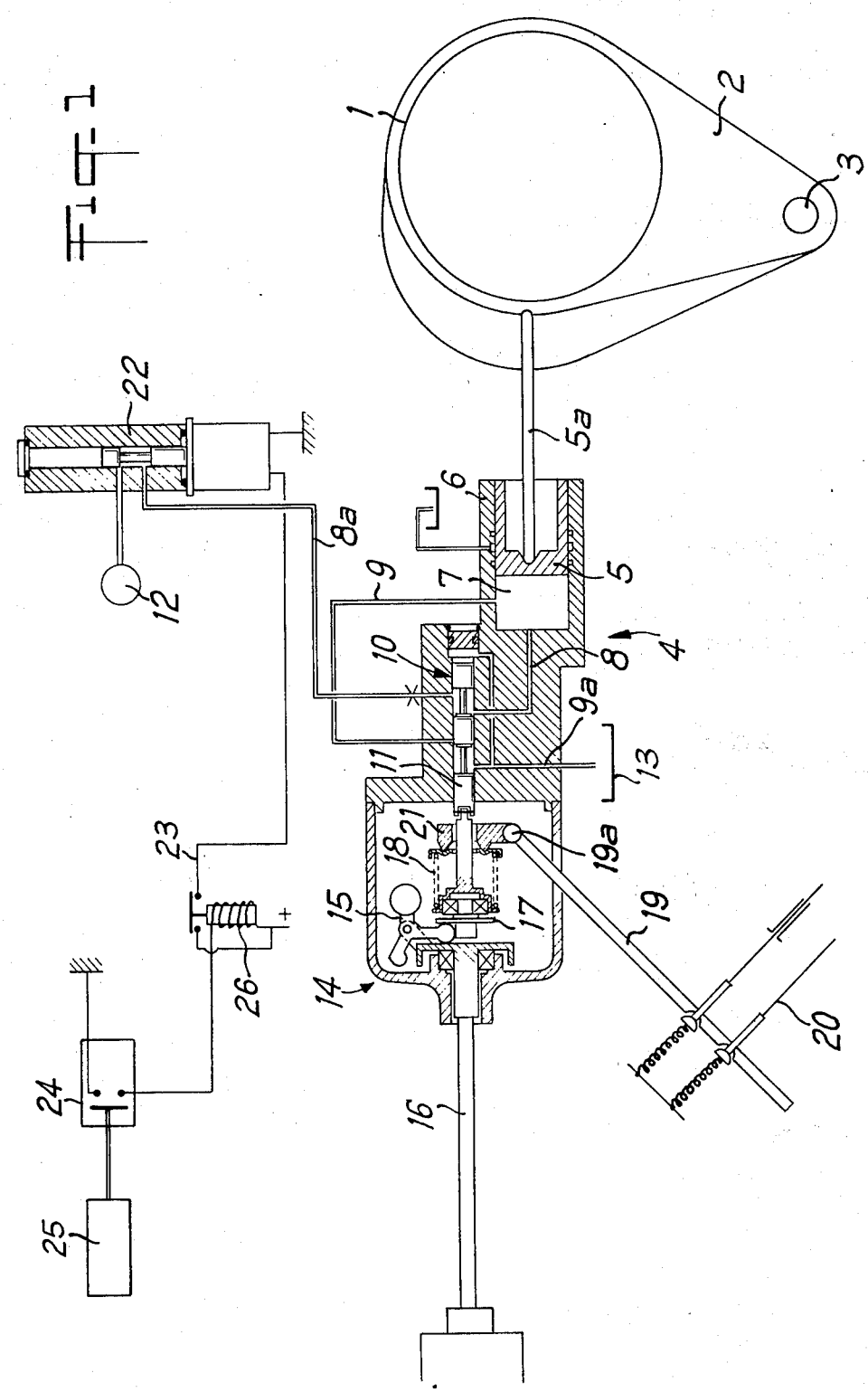
FIG. 1 is a part sectional diagram of a first embodiment of a device for regulating the operation of the transmission of a motor vehicle.

Referring firstly to FIG. 1, this shows a variator input device 1, referred to as primary rotor, which is mounted on a rocker 2 adapted to rotate about an arbor 3 and thus constitutes a step-down control element of the variator. The pivoting of the rocker about this arbor is controlled to the left in FIG. 1 by restoring means known per se (not shown) and to the right in FIG. 1 by a regulating device 4. This regulating device 4 comprises a hydraulic receiver consisting of a piston 5, of which a piston rod 5a is attached to the rocker and which is capable of sliding in a fixed cylinder 6. The piston 5 thus defines in this cylinder a chamber 7 into which lead a first conduit 8 for the inlet of a pressurised fluid and a second conduit 9 through which this fluid can be discharged. A distributor 10 having a slide valve 11 capable of three positions is arranged to control the fluid flows in the conduits 8 and 9. In a first position of the slide valve, the distributor establishes communication between the conduit 8 and a conduit 8a to permit the inlet of pressurised fluid into the chamber 7, the conduit 8a being itself connected to a source 12 of pressurised fluid. At the same time, the slide valve isolates the conduit 9 from a discharge conduit 9a which is arranged to discharge into a reservoir 13. In a second position of the slide valve the distributor establishes communication between the aforesaid conduits 9 and 9a and isolates the conduit 8 from the conduit 8a. Finally, in a third position of the slide valve, the distributor simultaneously isolates the conduits 8 and 9 from the conduits 8a and 9a respectively.

The slide valve 11 is connected by one of its ends to an element 14 which controls its movement; the element 14 comprising a centrifugal regulator 15 which is caused to rotate about an arbor 16 which is itself connected in known manner to the cam shaft of the engine. This regulator is in contact with a plate 17 which is rigid for translatory movement with the slide valve 11. The element 14 also comprises a resilient device e.g. a spring 18 which likewise bears on the plate 17 and the effect of which opposes that of the regulator 15. The tension of this spring 18 is a function of the angle of inclination of a lever 19 which, under the effect of a traction cable 20 connected to the accelerator pedal of the vehicle (not shown), can be pivoted about a pivot point 19a and which, through the medium of a plate 21, compresses the spring 18 to a greater or lesser degree.

The conduit 8a is connected to the source 12 through an electrically operated two-piston valve 22. In its non-energised position, which is the position shown in FIG. 1, it maintains communication between the source 12 and the said conduit 8a. In its energised position, on the other hand, it breaks this communication.

The energising circuit 23 of this electrically operated valve 22 comprises a normally open electrical switch 24 which is subject to the action of a device 25 for detecting the engine speed, such as a revolution counter or an electronic flip-flop circuit. The closure of this switch excites a relay 26 which in turn completes the circuit 23.

Some of the elements described with respect to FIG. 1 are to be found in FIG. 2, in which case they bear the same reference numerals.

Referring now in particular to FIG. 2, it will be noted that the device there shown additionally comprises a braking member 27 comprising in conventional manner a piston 28 sliding in a cylinder 29 and capable of pushing a shoe 30 which is attached to it. This brake referred to as the primary rotor brake, is intended to immobilise the said rotor, when necessary, at the level of a direction-reversing mechanism which is incorporated in the transmission to engage one system of gear teeth into another, particularly when the clutch consists of a hydraulic, magnetic torque converter or when the clutch is one which generally comprises by virtue of its construction, residual rotation at its output due to friction. Operation of the brake is actuated at the same time as the control of certain movements by means of the inverter.

The piston 28 defines with the cylinder 29 a chamber 31 into which a third conduit 32 leads for supplying the brake with pressurised fluid. An electrically operated valve 33 has four connections, the first of which is connected to the pressure source 12, the second of which is connected to the conduit 8a the third of which is connected to the aforesaid third conduit 32 and the fourth of which is connected to a discharge duct 34 leading to the reservoir 13. This electrically operated valve has two positions and when not energised, it establishes communication between the source 12 and the conduit 8a and communication between the conduits 32 and 34. When the valve is energised, it isolates the conduit 8a and the conduit 34, simultaneously establishing communication between the source 12 and the conduit 32.

The circuit which energises the electrically operated valve 33 also comprises the circuit 23 as shown in FIG. 1, a normally open switch 35 being disposed in the said circuit in parallel with the terminals of the switch 24. This switch 35 is connected in an appropriate manner to the manual control element of the inverter and therefore of the primary rotor braking device.

In operation, when the effect of the lever 19 predominates over that of the centrifugal regulator 15, that is to say when the driver is causing the vehicle to accelerate, the slide valve 11 of the distributor 10 is pulled to the left in the drawings so as to cause the conduits 8 and 8a to communicate while the conduit 9 is isolated from the conduit 9a. Therefore, there is an intake of pressurised fluid into the chamber 7, the piston 5 is therefore displaced to the right and pushes the rocker 2 into the direction of greater speed reduction. In response, the engine speed rises and, because it is now turning more quickly, the regualtor 15 counterbalances the effect of the lever 19 until equilibrium is established. The slide valve 11 is then in a neutral position which signifies that the chamber 7 is isolated both from the inlet and from the discharge. The rocker 2 is rendered immobile.

If, on the other hand, the driver somehwat relaxes the accelerator or if the load on the engine is reduced, for example if the road followed by the vehicle assumes a downward gradient, then it is the effect of the regulator 15 which predominates and the slide valve 11 is pushed to the right, that is to say to a position which connects the chamber 7 with the discharge. Under the effect of the restoring means incorporated in the rocker 2, the rocker returns to a position of lower speed reduction since the piston 5 no longer encounters any resistance due to the fluid enclosed in the chamber 7. The engine speed decreases until equilibrium of the slide valve 11 is again established.

If when the vehicle is travelling at high speed with the rocker 2 in its lowest ratio of step-down, it is assumed that damage occurs to the regulator 15 or its drive means, such that it ceases to operate, then under the effect of the members 18, 19 and 21, the slide valve 11 is pulled abruptly to the left resulting in the supply of pressurised fluid to the chamber 7. The rocker 2 is then pushed to the side corresponding to considerable speed reduction and the engine speed increases very rapidly. In order to avoid the engine racing, and serious damage to the vehicle, the device 25 which detects the rotary speed of the engine should it rise above a predetermined value, for example 5,400 r.p.m., closes the switch 24. The device 25 could likewise detect the speed either at the lever of the connecting means between the engine and the variator or at the level of the variator input shaft.

The relay 26 being thus energised, it closes the circuit 23 which energises the electrically operated valve 22 which breaks the communication between the source 12 and the conduit 8a. Continuance of the stroke of the piston 5 to the right is therefore stopped as is also the increase in step-down. Racing of the engine is advantageously stopped before the driver has managed to brake his vehicle.

If this damage occurs while the vehicle is travelling at a low speed, the rocker is in its zone of considerable speed reduction and the electrically operated valve 22 no longer has more than a secondary role in relation to the driver who is capable of stopping his vehicle in a very short time, in contrast to the preceding case.

In the example described with reference to FIG. 2, when the switch 24 is operated, the electrically operated valve 33, in addition to stopping the supply of pressurised fluid to the chamber 7, controls the supply of pressurised fluid to the brake 27. If the vehicle is travelling at high speed when damage occurs closure of the contractor 24 is effected when the rocker 2 is in its position of low step-down and is therefore remote from the brake 27 which is fixed. The operation of this brake is therefore ineffectual, which is the result desired in this case of safety operation. On the other hand, at as low speed, operation of the safety device produces a supply to the brake but it was seen earlier that the driver can act more effectively than he can at a high speed, so limiting the risk of damage to the brake shoe.

It will be noted that by reason of its design, when the vehicle is stationary and the engine is rotating at below a given speed, the regulating element 14 is such that the slide valve 11 is in its position for supplying the cylinder 6 and consequently the rocker 2 is in its position of greatest speed reduction.

However, when the switch 35 is operated by the device 36 which controls the reversal of travel of the vehicle, which is still stationary, fluid is supplied to the chamber 31 when the primary rotor is in proximity to the brake shoe 30. This supply is carried out by the electrically operated valve 33 which is energised when the switch 35 is closed, by virtue of its position parallel with the terminals of the switch 24. At the same time, the electrically operated valve 33 prevents the intake of fluid into the chamber 7, which in no way disturbs the operation of the device, the vehicle being in this case stationary and energising of the electrically operated valve being for a very short time.

The embodiment shown in FIG. 2 has the advantage of utilising only one electrically operated valve which has two distinct functions, so resulting is a simplification of the industrial production of this device and a lowering of its prime cost.

What is claimed is:

1. A device for regulating the operation of the transmission of a motor vehicle having a variator which includes a step-down control element, said device comprising a hydraulic receiver, an element movable in said receiver to define therewith a chamber, means connecting said movable element with the step-down control element of the variator, distributor means associated with said receiver, a slide valve to said distributor means, a source of pressure fluid, a reservoir for pressure fluid, first conduit means adapted to communicate said chamber through said distributor means with said source, second conduit means adapted to communicate said chamber through said distributor means with said reservoir, a centrifugal regulator movable in response to engine speed, connecting means associating the slide valve with the centrifugal regulator resilient means associated with said connecting means, means for controlling said resilient means in response to operation of an accelerator for said engine, said centrifugal regulator, said resilient means and said control means serving to establish three positions for said slide valve, in the first of which the effect of the resilient means predominates and communication is established between said chamber and said source through said first conduit means while preventing communication between said chamber and said reservoir through said second conduit means, in the second of which the effect of said centrifugal regulator predominates and communication is established between said chamber and said reservoir through said second conduit means while preventing communication between said chamber and said source through said first conduit means, and in the third of which the effects of the resilient means and the centrifugal regulator are in equilibrium and communication is prevented between said chamber and both said source and said reservoir, a two position electrically operable valve in said first conduit means and having a normally open position connecting said first conduit means with said source, an energising circuit for said valve, switch means normally holding said energising circuit open, and a device for detecting the rotary speed of the engine when said speed is at least equal to a predetermined value and for closing said switch means thereby to energise said circuit, close said valve and thus close said first conduit means.

2. A device as claimed in claim 1, and further comprising an input shaft to said variator, a cylinder, a piston slideably mounted in said cylinder, a shoe carried by the free end of said piston for engagement with said input shaft, said piston and cylinder defining a further chamber, third conduit means connecting said further chamber with said valve, two further connections to said valve, one for said third conduit means and the other leading to said reservoir, the valve in its normally open position establishing communication between said source and said chamber through the first conduit means and between said reservoir and said further chamber through the third conduit means, and in its closed position establishing communication between said source and said further chamber through said third conduit means, second switch means in said energising circuit and in parallel with the first mentioned switch means, and a control element of said piston and cylinder, said control element serving to operate said second switch means.

* * * * *